United States Patent [19]
Leiber et al.

[11] 3,832,008
[45] Aug. 27, 1974

[54] ANTI SKID CONTROL SYSTEM

[75] Inventors: Heinz Leiber, Leimen; Anton Rodi, Karlsruhe, both of Germany

[73] Assignee: Teldix GmbH, Heidelberg, Germany

[22] Filed: Feb. 2, 1972

[21] Appl. No.: 222,780

[30] Foreign Application Priority Data
Aug. 23, 1971 Germany............................ 2142144

[52] U.S. Cl....... 303/21 BE, 188/181 C, 303/21 EB
[51] Int. Cl............................................. B60t 8/08
[58] Field of Search............. 188/181 C; 303/20, 21; 317/5; 324/160–161; 340/263

[56] References Cited
UNITED STATES PATENTS

| | | | |
|---|---|---|---|
| 3,245,213 | 4/1966 | Thompson et al.............. | 303/21 EB |
| 3,525,553 | 8/1970 | Carp et al.......................... | 303/21 P |
| 3,556,610 | 1/1971 | Leiber............................... | 303/21 P |
| 3,653,727 | 4/1972 | Kullberg et al.................... | 303/21 P |
| 3,701,569 | 10/1972 | Arai et al.......................... | 303/21 BE |
| 3,705,748 | 12/1972 | Ochiai............................. | 303/21 BE |

Primary Examiner—Trygve M. Blix
Assistant Examiner—Stephen G. Kunin
Attorney, Agent, or Firm—Spencer & Kaye

[57] ABSTRACT

An antilocking control system in which slip signals are generated for brake pressure modulation. In this control system the circuitry for generating slip signals includes a unit for generating a signal proportional to the wheel speed and a memory circuit for generating a reference signal approximating the vehicle speed and having two different discharge time constants. When the second constant is effective, the stored signal follows decreases of the wheel speed very slowly. This constant is made effective, when a locking tendency occurs and the memory circuit is switched back to the first time constant only, if a permissible slip value is reached and particularly the re-acceleration phase is substantially completed. The slip signals are generated by comparing the reference signal from the memory circuit with the signal proportional to the wheel speed.

29 Claims, 10 Drawing Figures

FIG. 5
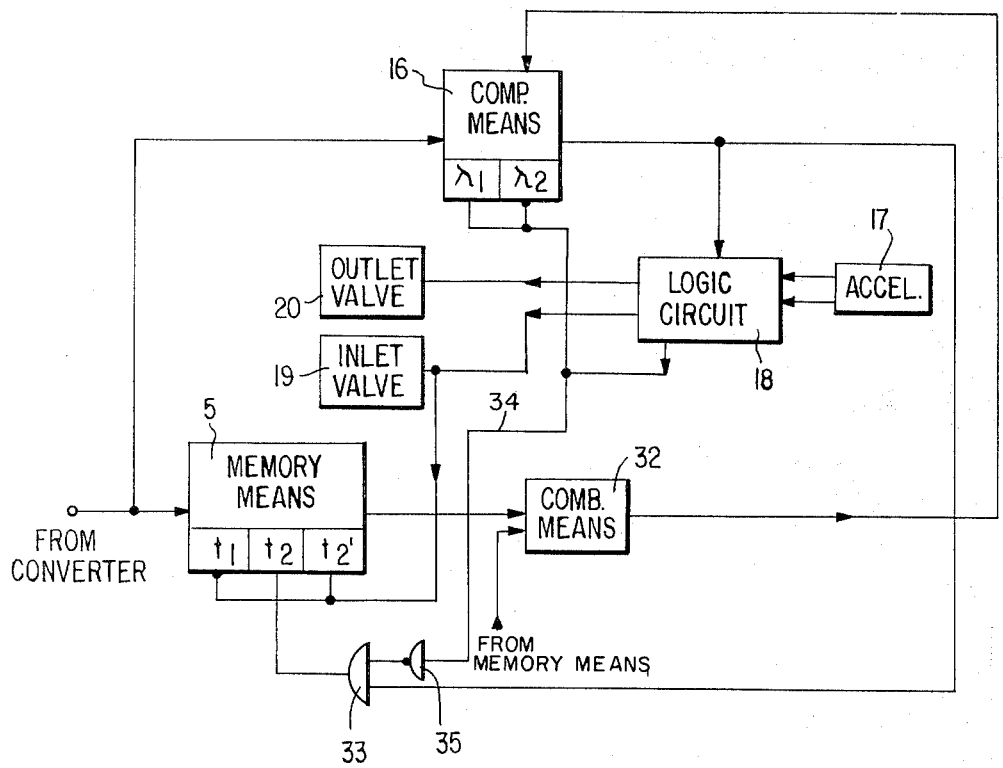
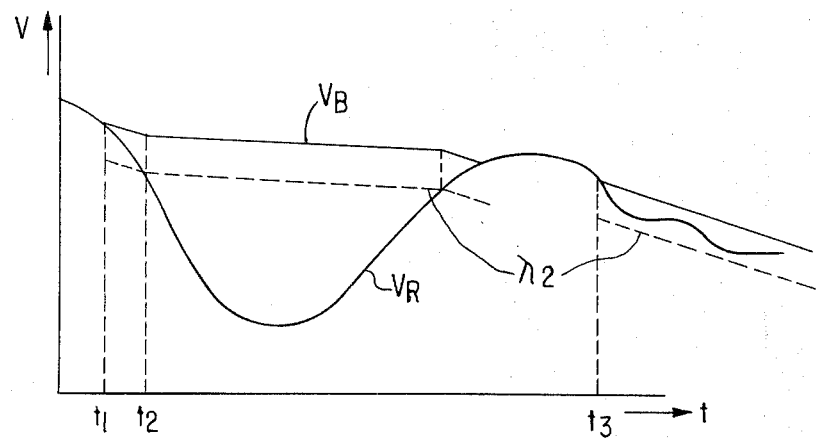
FIG. 6

ANTI SKID CONTROL SYSTEM

BACKGROUND OF THE INVENTION

This invention relates to an antilocking control system which develops control signals useful for controlling brake pressure. More particularly, the present invention relates to an antilocking control system in which slip signals are obtained and used to develop control signals useful for varying the brake pressure. Additionally also deceleration and/or acceleration signals may be used for varying brake pressure.

In systems of the type under consideration, a reference signal which is an approximation of the vehicle speed is used for comparison with the rotational speed of the wheel. To produce this signal, a signal amplitude proportional to the rotation speed of the wheel is fed into a memory circuit in such a manner that the stored signal in the memory circuit follows increases in the rotational speed without delay, but follows decreases in the rotational speed with different discharge time constants in dependence on the rotational behavior of the wheel.

In antilocking control systems for vehicles which utilize the wheel slip, $(V_F - V_R)/V_F$, where $V_F$ is the vehicle speed and $V_R$ the wheel speed, with reference to the speed of the vehicle, to vary the brake pressure, (and if necessary also deceleration and/or acceleration signals) strictly speaking, the exact vehicle speed is required to determine the slip. For vehicles in which all wheels are braked, the vehicle speed cannot be directly derived from the wheel speeds. It has therefore been attempted, with the aid of memory circuits to which are fed signals, e.g. voltages, which are proportional to the speeds of a plurality of wheels, to form a signal which is an approximation of the vehicle speed. The memory circuits are so designed that the charge state of the memory component of the memory circuit follows without delay the highest signal amplitude supplied from speed sensors when there is an increase in the number of revolutions and the memory charge drops with a delay when the number of revolutions of all participating wheels decreases, the discharge time constant being so dimensioned that the decrease in the charged state corresponds to the normal deceleration of the vehicle traveling on a road with a high coefficient of friction $\mu$. This deceleration is approximately 1 g as is disclosed in, for example, Laid Open German Patent Application No. 1,961,741. It has been found in practice that when braking on a road with a low coefficient of friction this technique of reference signal generation does not result in an optimum approximation to the actual changing of the vehicle speed and thus does not produce optimum control in this case.

A further technique for forming the reference signal has become known, and is disclosed in Laid Open German Patent Application No. 1,916,518, in which the memory component of a memory circuit is also charged without delay to a voltage proportional to the speed of the wheel and in which different discharge time constants can be made effective. For the one discharge time constant which is normally effective the discharging takes place at a speed which corresponds to a deceleration of more than 1 g and which lies, for example, at about 1.3 g. During the actuation of the valve which reduces the brake pressure a discharge time constant "infinite" is made effective, i.e. the momentarily furnished signal amplitude which corresponds to the momentary wheel speed is maintained. With the joining of periods in which the charge is kept constant with those in which the charge drops in the above-mentioned manner, a varying amplitude signal is produced whose average rate of drop is an approximation of the actual vehicle deceleration. This way of forming the reference signal also does not produce optimum control because it may happen that the reference signal exceeds the actual vehicle speed and because the stored signal value in the memory component is adapted to the wheel speed at a moment when the wheel speed is still in an unstable range.

SUMMARY OF THE INVENTION

It is an object of the present invention to provide in an antilocking control system a circuit arrangement which permits the realization of optimum control.

It is another object of the present invention to provide in an antilocking control system a circuit arrangement which avoids developing a reference signal amplitude from wheel speed during periods the wheel speed is in an unstable range.

It is a further object of the present invention to provide in an antilocking control system a circuit arrangement which develops a reference signal approximating actual changing of the speed of a vehicle even when braking on a surface having a low coefficient of friction.

The foregoing objects, as well as others which will become apparent from the text below, are accomplished in accordance with the present invention by providing an antilocking control system in which slip signals and, if necessary, also deceleration and acceleration signals are generated for brake pressure modulation, the means for generating slip signals consisting of means for generating a signal which is substantially directly proportional to the rotational speed of a vehicle wheel, memory means for generating a reference signal approximating the vehicle speed, the said means receives the signal proportional to the rotational speed and has two different discharge time constants, these constants being chosen in such a manner that the stored signal follows the signal proportional to the rotational speed substantially without delay when the first discharge time constant is effective, but follows a decrease in wheel speed according to a low decrease in vehicle speed when the second discharge time constant is effective, comparison means in which the signal proportional to the rotational speed and the reference signal from the memory means are compared and which generate an output signal for brake pressure modulation, switching means which are responsive to signals indicating a locking tendency and which switch the memory means to the second discharge time constant when a locking tendency occurs and which switch the memory means back to the first time constant only if a permissible slip value is reached and particularly the reacceleration phase is substantially completed.

It is a characteristic of the present invention that, upon the occurrence of signals indicating a tendency to lock, corresponding to negative acceleration and/or a certain degree of slip, the system is switched from a first time constant which permits the stored signal amplitude to follow the amplitude supplied even when the reduction in speed is rapid, to a second time constant which effects a reduction in the reference signal amplitude which corresponds to a reduction of the speed of the braked vehicle on a road with a low coefficient of friction and that the system is switched back to the first time constant only when the wheel has a permissible slip value and preferably when the re-acceleration phase has also been substantialy terminated.

It is thus proposed, according to a preferred embodiment of the present invention, to select the second time constant in such a way that the discharge corresponds to very low deceleration values for the vehicle due to a low coefficient of friction, e.g. approximately 0.1, preferably the lowest possible deceleration occurring in practice, but that with the first time constant the stored signal amplitude follows the wheel speed practically immediately. However, with this manner of forming a reference signal it is important that this adjustment to the wheel speed takes place only when the wheel is again in the stable speed range. This is the case when the slip has fallen below the permissible value and preferably the re-acceleration phase is substantially completed.

If the setting member for the brake pressure variation is used in the known form of a normally open inlet valve and a normally closed outlet valve, the above-described conditions for the moment of switching to the second discharge time constant and the time period over which this switched state remains effective can be met in a simple manner in that the control signal for the inlet valve is also utilized as a switching order to the second discharge time constant. Since, with the use of a second acceleration threshold upon whose passing the inlet valve opens, this may cause a switch to the first time constant $\tau_1$ without the re-acceleration being completed, the occurrence of the second acceleration signal is preferably used to prevent a switch back to $\tau_1$.

If the brake pressure is separately controlled at the wheels of one axle, it is desirable to provide a separate memory circuit for each wheel which receives a signal, from a wheel speed sensor, which corresponds to the rotational speed of the associated wheel. The time constant switching for the separate memory circuit is controlled by signals obtained from the wheel speed sensor of the associated wheel. If each wheel has its own inlet and outlet valve, the control signal for the inlet valve can be used as the switching criterion, the second acceleration signal also being additionally used, if required. To form the actual reference signal, in preferred embodiments of the present invention, the higher one of two signals from different wheels of an axle which are supplied to the memory circuits is selected or the two supplied signals are used to form an average. The described reference signal formation can also be effected at the wheels of both axles, in preferred embodiments of the present invention, and then again the higher one of the two or an average thereof can be used as the reference signal for the slip determination of the individual wheel, average formation here being intended to mean not only the accurate average formation but also an incorporation of the two signals with one being weighted more than the other.

The above-described formation of the reference signal from the wheel speeds of an axle is particularly of interest for the wheels of the nondriven axle. This obtained reference signal may also be used in a known manner as the reference signal for the slip determination at the driven wheels. It is moreover possible, as already mentioned, to incorporate the signal which is proportional to the highest rotational speed of the driven wheels into the reference signal formation in such a manner that whenever the signal which is proportional to the highest rotational speed of the driven wheels or a significant portion thereof, e.g. 95%, exceeds the amplitude of the signal obtained at the nondriven axle, this higher signal is used as the reference signal. For this purpose a memory circuit may be provided which has the same time constants as the memory circuit associated to the nondriven wheels. This additionally provided memory circuit receives the higher of the voltages obtained from speed sensors associated with the nondriven wheels and is switched to its second time constant (slow dropping of the stored momentary value) whenever and as long as the signal proportional to the highest wheel speed of the driven wheels exceeds in amplitude the reference signal obtained at the nondriven axle.

This stored signal value forms the reference signal as long as it exceeds in amplitude the reference signal obtained at the nondriven wheels. Switching to the second time constant may also be made dependent on whether the memory circuit output voltage exceeds in amplitude the reference signal obtained at the nondriven axle.

Instead of incorporation of signals provided from the driven wheels it is also possible to obtain a further memory instruction (switching to the second time constant) for one or both of the memory circuits associated with the nondriven wheels when a substantial portion, e.g. 90–95%, of the higher one of the signals obtained at the driven wheels exceeds in amplitude the reference signal obtained at the nondriven wheels. This makes it possible, inter alia, for reference signal formation to be actuated whenever the wheel speeds at the nondriven wheels drop without there being present a deceleration signal.

Instead of the above-mentioned selection of the higher signal amplitude obtained in the above-mentioned manner at the two axles, it is also possible to form an average from these values.

BRIEF DESCRIPTION OF THE DRAWINGS

FIG. 5 is a part of a block circuit diagram of an antilocking control system illustrating another embodiment of the present invention.

FIG. 6 is a graphical representation illustrating the formation of the reference signal developed in the circuits shown in FIG. 5.

DESCRIPTION OF THE PREFERRED EMBODIMENTS

Figure 1:
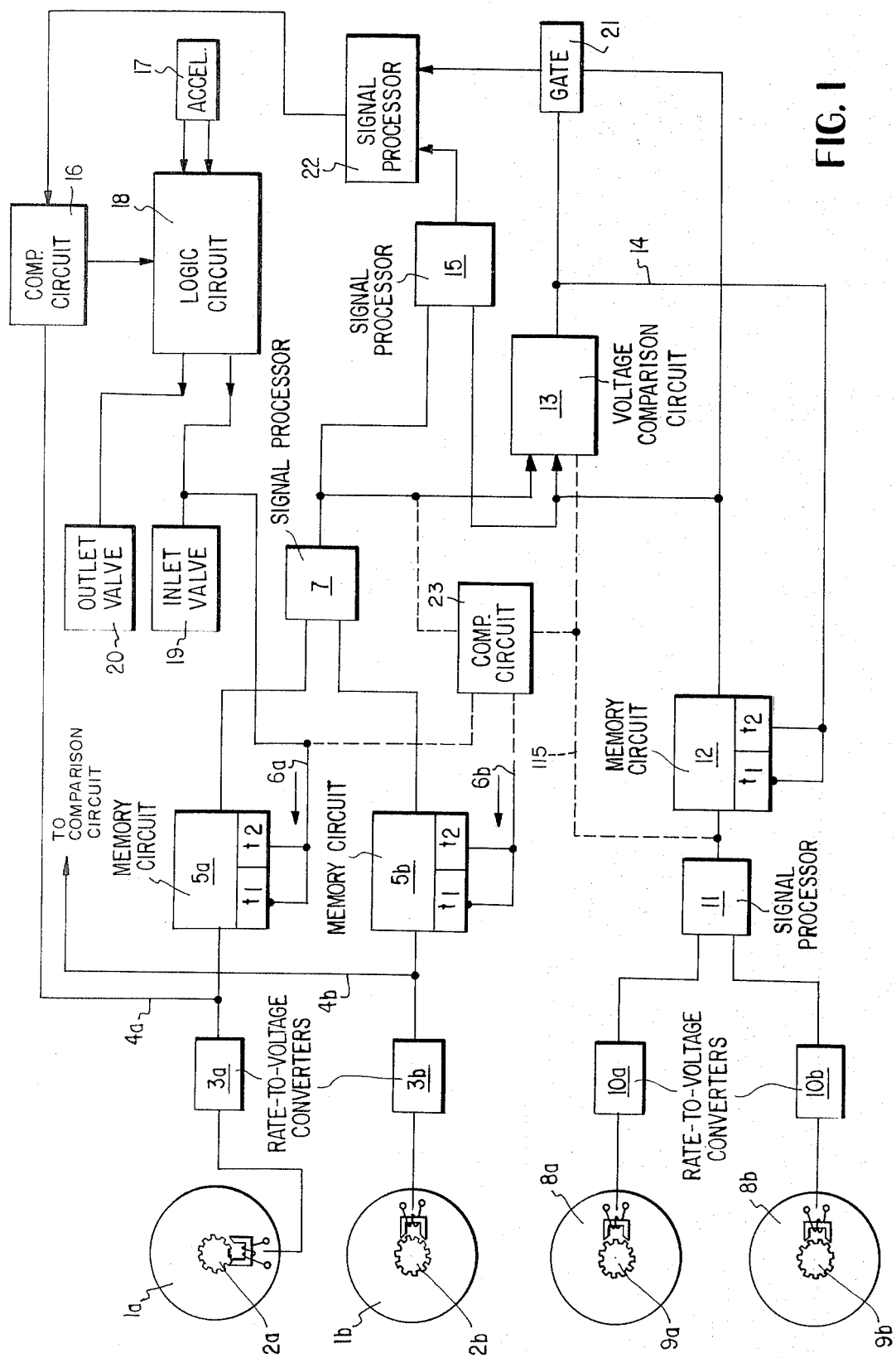
FIG. 1 is a block circuit diagram of an antilocking control system illustrating the present invention.

Referring to FIG. 1, an antilocking control system suitable for a vehicle driven through two rear wheels 8a and 8b is shown. The vehicle has two front wheels 1a and 1b.

A wheel speed sensor 2a, which produces a pulse train having a pulse repetition rate proportional to the rotational speed of the wheel 1a, is associated with the wheel 1a. An additional wheel speed sensor 2b, which furnishes a pulse train whose pulse repetition is proportional to the rotational speed of the wheel 1b, is associated with the wheel 1b.

The pulse trains from the wheel speed sensors 2a and 2b are fed respectively to pulse repetition rate-to-dirct voltage converters 3a and 3b. The output signal voltages from the converters 3a and 3b are respectively directly proportional to the rotational speed of the wheels 1a and 1b.

The output signal from the converter 3a is fed via a line 4a to one input of a voltage comparison circuit 16, the other input of which receives a reference signal which is approximated to the speed of the vehicle.

It will be appreciated that slip may be defined by the expression $(V_F - V_R/V_R$ where $V_F$ is vehicle speed and $V_R$ is the speed of a wheel. When the measured slip exceeds a given value, control signals are produced and fed to the logic circuitry 18 which varies the brake pressure. Many different techniques for varying pressure are known. The pressure varying apparatus may include, for example, a normally open inlet valve 19 and a normally closed outlet valve 20 for each of the wheels 1a and 1b.

In practice, the voltage signal supplied through the line 4a is compared with a certain percentage (e.g. 90%) voltage reference signal corresponding to the speed of the vehicle by the comparison circuit 16. As shown in FIG. 1, the reference signal is supplied from the signal processor 22. Whenever the signal voltage directly proportional to the rotational speed of the wheel 1a is lower than the certain percentage reference signal, the comparison circuit 16 produces a control signal.

In order to produce the reference signal, the output direct voltage signal proportional to the rotational speed of the wheel 1a from the repetition rate-to-voltage converter 3a is fed to a vehicle speed memory circuit 5a. The memory circuit 5a can normally follow without significant delay the changes in the direct voltage signal from the converter 3a, i.e. when a low time constant $\tau_1$ is effective, even if these changes take place very rapidly, either in the direction of an increase in voltage or in the direction of decrease in voltage.

If there occurs a very rapid deceleration of the wheel 1a, i.e. the wheel 1a tends to lock, the memory circuit 5a is switched to a higher time constant $\tau_2$ by a switching signal through a line 6a which receives a signal from logic circuit 18, indicating rapid deceleration of the wheel 1a exceeding a threshold level. For this purpose there is provided an accelerometer 17 which feeds a deceleration signal to the logic circuit 18, when the deceleration of the wheel 1a exceeds a given threshold. The logic circuit 18 may be similar to the circuit described in FIG. 3 of copending patent application Ser. No. 198,336, entitled CONTROL SYSTEM, filed by Rodi, Leiber, Jonner and Korasiak on Nov. 12, 1971, and corresponding to German application Ser. No. P 20, 63, 944.4 of Dec. 28, 1970. The accelerometer 17 also preferably responds to acceleration of the wheel 1a and provides an additional output signal so long as the acceleration of the wheel 1a exceeds a given threshold level, this additional output signal being coupled to the logic circuit. The logic circuit 18 controls the inlet and the outlet valves 19 and 20 and also the switching of the memory circuit 5a. The memory circuit — in the example of FIG. 1 — is switched to its higher time constant $\tau_2$, when and as long, as the inlet valve is closed.

The memory circuit 5a is switched to or remains at the higher time constant $\tau_2$ because of the presence on the line 6a of a switching signal which is present whenever either the deceleration of the wheel 1a exceeds a threshold level, or the acceleration of the wheel 1a is above a threshold level indicating that re-acceleration is not yet completed, or the slip of the wheel 1a exceeds a given value during the control period. The value of the higher time constant $\tau_2$ is selected so that the voltage value of the voltage stored in the memory circuit 5a at the moment of switching will be permitted to drop only very slowly, i.e. so slowly that the dropping corresponds to only a vehicle deceleration on a roadway with a low coefficient of friction, preferably that which could be expected from a very smooth surface (ice).

In the described example of FIG. 1, the brake pressure variation is effected in a known manner by a normally open inlet valve and a normally closed outlet valve, the switching from the lower time constant $\tau_1$ to the higher time constant $\tau_2$ is advantageously effected upon the occurrence of a closing signal for the inlet valve which signal is produced at the occurrence of a certain deceleration at wheel 1a. The switched state remains in force until the wheel 1a has completed its re-acceleration phase after the brake pressure reduction, indicated by the absence of signals from the accelerometer 17, and until an undue wheel slip is no longer present, indicated by an absence of a signal from the comparison circuit 16.

Figure 2:
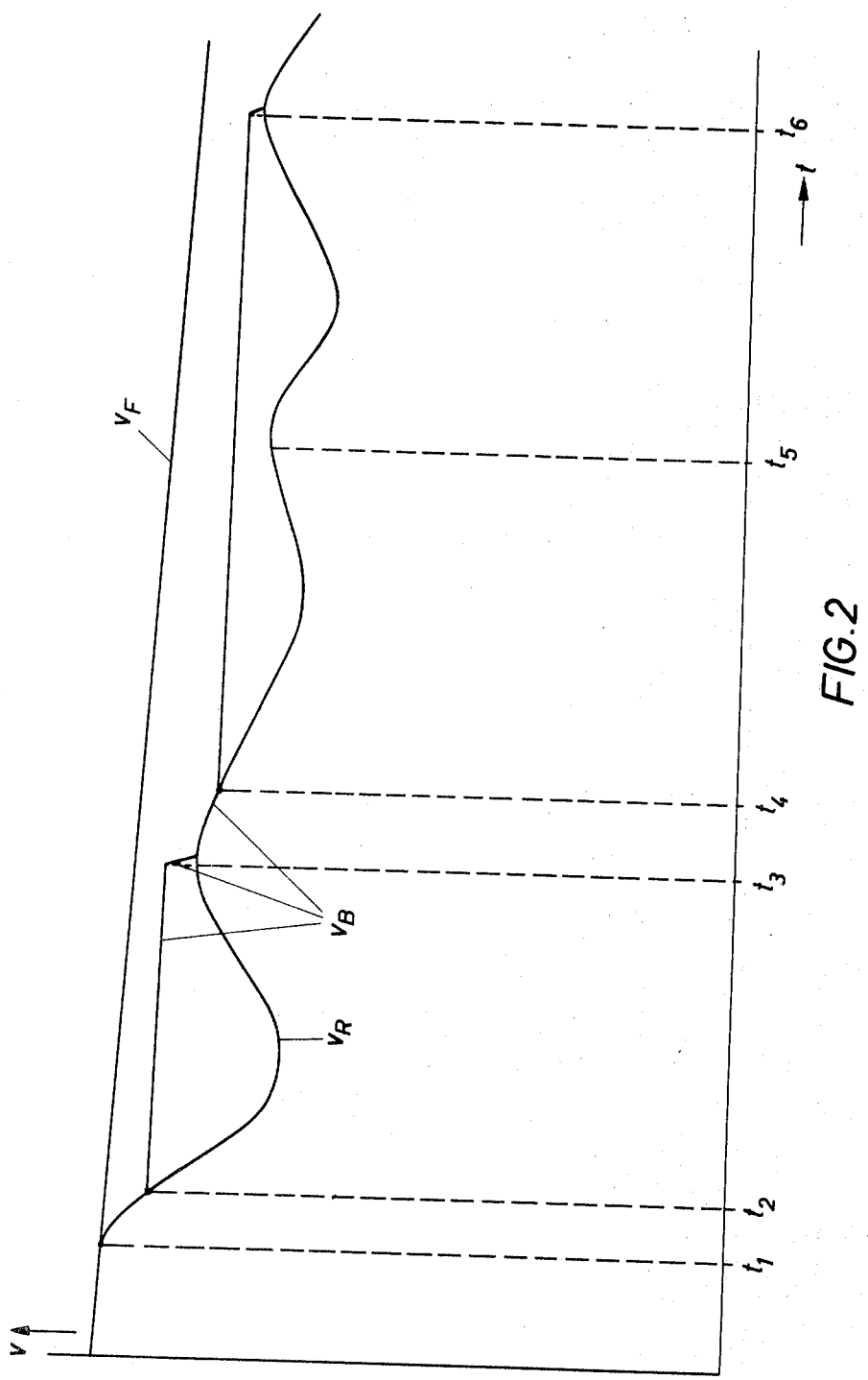
FIG. 2 is a graphical representation illustrating the formation of the reference signal developed in the circuits shown in FIG. 1.

FIG. 2 is a graphical illustration of the time sequences of the speeds plotted over time $t$. In FIG. 2 a curve $V_F$ corresponds to speed of the vehicle, a curve $V_R$ corresponds to the speed of the wheel 1a, and the curve $V_B$ corresponds to the produced reference signal. Up to the onset of the braking process the vehicle speed and the wheel speed are identical. With the beginning of the braking process at a time $t_1$ the wheel is decelerated. The deceleration is so high at a time $t_2$ that a control signal is produced by the accelerometer 17 which signal prevents, via the logic circuit 18 and the inlet valve 19, the brake pressure from increasing any further but simultaneously also cuases the discharge time constant of the memory 5a to be switched to the higher value $\tau_2$. The memory circuit 5a then emits the reference signal $V_B$ until a time $t_3$. This signal serves to measure the slip. If the deceleration of the wheel 1a continues beyond the time $t_2$, as assumed in FIG. 2, the exceeding, for example, of a permissible slip value initiates the pressure reduction. The wheel 1a is thus reaccelerated and the pressure reduction is terminated. Once the re-acceleration phase is terminated and no undue slip is present any longer, the system is switched back to the lower time constant $\tau_1$ at a time $t_3$ so that the reference signal level is substantially immediately adjusted upwardly or downwardly (as shown in FIG. 2) to the speed of the wheel 1a. When an inlet and an outlet valve are employed, this is the time at which the inlet valve opens, i.e. the pressure increases again. At a time $t_4$ the delay in the response is again established. The storing (with $\tau_2$) is actuated again. Although the re-acceleration is completed at a time $t_5$, the system is not switched back to the lower discharge time constant $\tau_1$ because the slip, as determined by the comparison circuit 16a, is still too high. Finally, at a time $t_6$ all conditions for switching back to the lower time constant $\tau_1$ are present so that the reference signal level can be set again to the speed of the wheel 1a.

The output signal or a given percentage thereof from the memory circuit 5a can be used as the reference signal for the slip measurement at several wheels. In this case, the output signal from the memory circuit 5a would be fed directly to the comparison circuit 16. There is also provided a memory circuit 5b. It, like the memory circuit 5a, has two different time constants, $\tau_1$ and $\tau_2$. The memory circuit 5b can normally follow without significant delay the changes in the direct voltage signal from the converter 3b, i.e. when the low time constant $\tau_1$ is effective, even if these changes take place rapidly, either in the direction of a decrease in voltage or in the direction of an increase in voltage.

If a rapid deceleration of the wheel 1b occurs, i.e. the wheel 1b tends to lock, the memory circuit 5b is switched to the higher time constant $\tau_2$ by a switching signal through a line 6b; that signal indicates rapid deceleration of the wheel 1b. There may be associated to the wheel 1b a comparison circuit, an accelerometer which responds to positive and negative acceleration, a logic circuit and an inlet and an outlet valve. For the sake of simplicity, these devices are not shown in FIG. 1. They are identical with the devices 16–20 associated to wheel 1a, and are interconnected in the same manner whereby the two comparison circuits receive the same reference signal. If a slip occurs which is too high, the memory circuit 5b is switched to the higher time constant $\tau_2$ by a switching signal through the line 6b which receives a signal from the associated comparison circuit.

The comparison circuit associated to wheel 1b (not shown) receives, as its one input, the same reference signal from the signal processor 22 as does the comparison circuit 16. The other input signal to the comparison circuit is provided via a line 4b from the pulse repetition rate-to-direct voltage converter 3b which produces a direct voltage signal which is directly proportional to the rotational speed of the wheel 1b. The output of the comparison circuit associated to wheel 1b is fed to the corresponding logic circuit. This logic circuit controls the corresponding inlet and outlet valves and the memory circuit 5b in the same manner as logic circuit 18 controls the valves 19 and 20 and the memory circuit 5a.

The memory circuit 5b is such that it is switched to or remains at the higher time constant $\tau_2$ whenever a switching signal appears on the line 6b. Thus, the memory circuit 5b functions with its higher time constants $\tau_2$ when either the deceleration of the wheel 1b exceeds a threshold level or the acceleration of the wheel 1b exceeds a threshold level indicating re-acceleration of the wheel 1b has not yet been completed or the slip of wheel 1b exceeds a given value during the control period.

An improvement in the formulaion of the reference signal results if the speed of the second undriven wheel 1b is considered in addition to the speed of the first undriven wheel 1a. In this instance the output signal from the memory circuit 5b and the output signal from the memory circuit 5a are fed to a signal processor 7. The signal processor 7 is a conventional circuit which selects the higher of its two voltage input signals, the selected voltage signal being the reference signal which may be used, in this case, as the reference signal input to the comparison circuit 16 and the other comparison circuit. Instead of selecting the higher input signal, the signal processor 7 may be of a different conventional construction and be operative to form an average voltage output signal from its two input voltage signals. In this case, the averaged output signal from the signal processor 7 is used as the reference signal. In both of these two cases the output signal from the signal processor 7 may be used to control the front wheels 1a and 1b as well as rear wheels 8a and 8b. The comparison circuit for the rear wheels is not shown for the sake of simplicity.

A still further improvement in the formulation of the reference signal results if the speeds of the driven rear wheels 8a and 8b are used, in addition to the speeds of the undriven front wheels 1a and 1b, in the formulation of the reference signal. Two basic possibilities for this are illustrated in FIG. 1. The driven rear wheels 8a and 8b are provided, respectively, with respective wheel speed sensors 9a and 9b which produce pulse trains, the repetition rates of which are directly proportional to the rotational speed of the rear wheels 8a and 8b.

The pulse train outputs from the two wheel speed sensors 9a and 9b are fed, respectively, to pulse repetition rate-to-direct voltage converters 10a and 10b, which produce voltage output signals which, in amplitude, are directly proportional to the wheel speeds of the rear wheels 8a and 8b, respectively.

The direct voltage output signals from the voltage converters 10a and 10b are coupled to a signal processor 11 of conventional construction. The signal processor 11, like the signal processor 7, may be operatively arranged either to select the higher of its input signals or to average its two input signals, passing on the selected or averaged signal to a memory circuit 12.

The memory circuit 12, like the memory circuits 5a and 5b, is provided with two different time constants $\tau_1$ and $\tau_2$. The output voltage signal from the memory circuit 12, which normally operates with the time constant $\tau_1$, is compared with the output voltage signal from the signal processor 7 by a voltage comparison circuit 13. If the output voltage signal from the memory circuit 12 or a substantial portion thereof (e.g. 95%) is higher than the output voltage signal from the signal processor 7, the memory circuit 12 is switched to the higher time constant $\tau_2$ by a signal output from the voltage comparison circuit 13 which appears on a line 14.

The output signal from the memory circuit 12 is coupled to one input of a signal processor 15 which is provided with a second input from the signal processor 7. The signal processor 15, like the signal processors 7 and 11, is a conventioal circuit which may be operatively arranged either to select the higher of its input signals or to average its two input signals, passing on the selected or averaged signal via the signal processor 22 as inputs to the voltage comparison circuits.

In the case where the signal processor circuit 15 is constructed to select its higher input signal as the signal to be passed, as the reference signal, to the voltage comparison circuits, the signal processor 22 is not necessary.

In the case where the signal processor circuit 15 is constructed to average its inputs so as to provide its output, it is desirable to provide, as a further improvement, the signal processor 22 which selects and passes on its higher input signal and the normally closed transmission gate circuit 21. This gate circuit 21 receives as signal input the output signals from the memory circuit 12. An output signal from the voltage comparison circuit 13 is coupled as the control input signal to the gate 21, the control input signals being effective to open the transmission gate 21 whenever the voltage comparison circuit 13 determines that the output signal from the memory circuit 12 exceeds that from the signal processor 7. Thus, when the output signal from the signal processor 7 falls below the output signal from the memory circuit 12, the output signal from the memory circuit 12 is fed via the gate circuit 21 to the signal processor 22 which passes it on as the reference signal to the inputs of the comparison circuits when it is higher than the output of processor 15. The output signal from the signal processor 15 is, in this case, effectively cut off by the signal processor 22. This particular reference signal formation is effective when, for example, the front wheels 1a and 1b experience a quick turn of the steering wheel on a surface having a low coefficient of friction. Instead of the signal processor 22, it is possible to use a transmission gate circuit to the input of which the output of processor 15 is connected and which is closed when gate circuit 21 is open. Either the output of that gate circuit or the output of gate circuit 21 forms in this case the reference signal.

Instead of the output signal from the memory circuit 12 being fed to one input of the voltage comparison circuit 13, the output voltage signal from the signal processor 11 or a given substantial portion thereof (e.g. 90%) can be supplied to an input of the voltage comparison circuit 13 as indicated by the dashed line 115. In this case, the voltage comparison circuit 13 switches the memory circuit 12 to its higher time constant whenever the voltage directly related to the rear wheel speed exceeds the stored voltage related to front wheel speed. If the signal processor 15 averages the input signals, it is preferred to store the value proportional to the higher speed of the rear wheels in memory circuit 12 in case the higher voltage of the rear wheels exceeds the output signal of processor 12 or the higher voltage of the rear wheels is lower than the output of processor 7 by a significant amount ($\mu$ − jump).

According to another embodiment of the invention, the selected output of processor 7 is used as reference signal and in addition switching signals for at least one but preferably for both memory circuits 5a and 5b are generated by comparing the output signal of processor 7 with the output signal of processor 11 or a substantial portion thereof. This embodiment is shown by dashed connecting lines. The said signals are coupled to inputs of a voltage comparison circuit 23, which provides an output signal whenever the voltage output signal from the signal processor 11 or a substantial portion thereof exceeds the voltage output signal from the signal processor 7. The output from the voltage comparison circuit 23 is coupled to the two memory circuits 5a and 5b to effect a switching of these circuits to their higher time constant $\tau_2$ without regard to the condition of the other voltage comparison circuits and the accelerometers 17.

Figure 3:
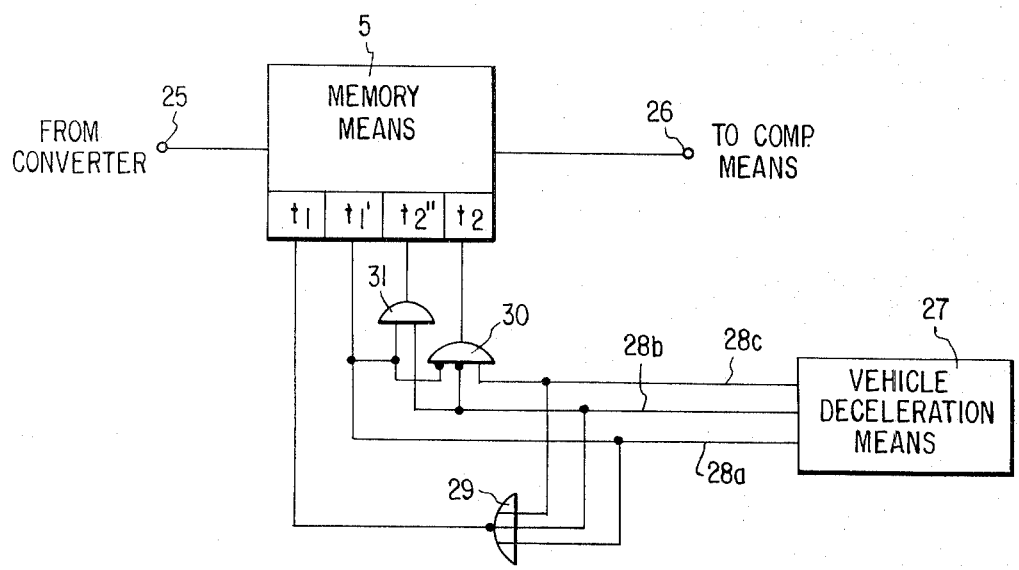
FIG. 3 is a part of a block circuit diagram of an antilocking control system illustrating another embodiment of the present invention.

With the arrangement described above now having two discharge time constants, in most cases a sufficient antilocking control is obtained. With certain vehicle types, as for instance vehicles being driven at the front wheels, and under certain circumstances, for example low vehicle speed, this control however is no optimum solution. According to a further improvement of the invention, at least one further discharge time constant is provided in addition to the two mentioned discharge time constants. These further time constants are different; their values, however, are between the discharge time constants $\tau_1$ and $\tau_2$ mentioned above. In this case, too, the memory means are switched from the time constant $\tau_1$ to one of the other time constants when a locking tendency occurs. Then the time constant $\tau_2$ and the other time constant(s) are attributed to different vehicle deceleration values, namely in such a manner that with increasing vehicle deceleration decreasing time constants are made effective; thus, the course of the reference signal is better approximated to the vehicle speed. This can be seen in FIGS. 3 and 4. In FIG. 3, only the memory circuit 5 is shown, which may be connected with its input terminal 25 to the converter 3a of FIG. 1. The output terminal 26 may be connected to the comparison means 16, either directly or via different processors for the inclusion of corresponding values of other wheels, for example as shown in FIG. 1. Now the memory means is provided with four discharge time constants $\tau_1$, $\tau_2$, $\tau_2{'}$ and $\tau_2{''}$. The constants $\tau_1$ and $\tau_2$ correspond to the time constants of FIG. 1. $\tau_2{'}$ and $\tau_2{''}$ have different values between $\tau_1$ and $\tau_2$. There is provided a vehicle accelerometer 27, the outputs 28a–28c of which are connected to the control inputs of the memory means 5. Output 28c provides a signal when the vehicle deceleration reaches a first low deceleration threshold, output 28b provides a signal when a second deceleration threshold of middle value is reached and finally output 28a provides a signal when the highest threshold is reached. By means of the OR gate 29 with inverted output it is effected that the time constant $\tau_2$ is effective when one of the outputs 28a–28c provides a signal. By means of the AND gate 30, to which the outputs 28a and 28b are connected invertedly (shown as a point at the inputs) it is effected that time constant $\tau_2$ — i.e., the highest time constant — is effective when output 28c provides a signal. Due to the AND gate 31, $\tau_2{''}$ (which is higher than $\tau_2{'}$) is effective when output 28b provides a signal. Finally, the time constant $\tau_2{'}$ is effective when output 28a provides a signal.

Figure 4:
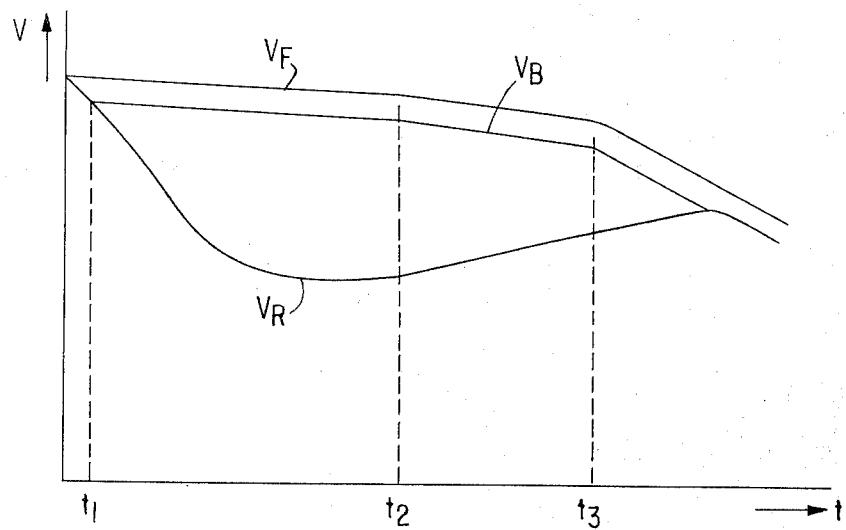
FIG. 4 is a graphical representation illustrating the formation of the reference signal developed in the circuits shown in FIG. 3.

FIG. 4 shows a constructed curve of vehicle speed and reference signal provided that these four time constants are used. The curve $v_F$ corresponds to vehicle speed, curve $v_R$ to wheel speed and curve $v_B$ to the reference signal. It is supposed that beginning at time 0 the vehicle is braked on a surface with a very low friction coefficient $\mu$. For this reason, the vehicle is decelerated only a little. At time $t_1$, the lowest deceleration threshold in 27 is reached and the memory means are switched from $\tau_1$ to $\tau_2$. Beginning at time $t_2$, the vehicle drives on a surface with a higher friction coefficient. Therefore, the vehicle deceleration increases. Then, in accelerometer 27, the following deceleration threshold is reached, which makes effective the lower time constant $\tau_2$ ''. Finally, at $t_3$, the vehicle reaches a surface with still a higher friction coefficient, due to which the vehicle deceleration increases. Now the highest deceleration threshold responds and makes the lower time constant $\tau_2$ ' effective. FIG. 4 shows that a good approximation of the reference signal to the vehicle speed is obtained.

The solution of FIG. 3 is expensive because a vehicle accelerometer is needed. Therefore, the following sections give some examples which are less expensive but which also bring about a good approximation.

FIG. 5 shows only a part of FIG. 1. There are shown the memory means 5, a combining circuit 32, which may include one or more processors (according to FIG. 1) to generate a reference signal from several wheels, a comparison means 16, a logic circuit 18, an inlet valve 19, an outlet valve 20 and a wheel accelerometer 17.

Contrary to FIG. 1, now the memory means are switched from $\tau_1$ to $\tau_2$ ' when a locking tendency occurs. In the shown embodiment the switching is done when the inlet valve 19 is energized. In this case $\tau_2$ ' here is a third time constant, the value of which is between $\tau_1$ and $\tau_2$. As shown in FIG. 6, now between $t_1$ and $t_2$) the reference signal decreases with a given slope. The constant $\tau_2$ ' remains effective until time constant $\tau_2$ is made effective via AND gate 33. Then $\tau_2$ ' is ineffective. The switching to $\tau_2$ is done when on connection line 34 no signal is present (due to the negation member) and when a slip signal is present at the output of the comparison means 16. Via the connection line 34, the comparison means 16 are switched between two slip thresholds $\lambda_1$ (comparison of the wheel speed signal with, for example, 95% of the reference signal) and $\lambda_2$ (for example 80% of the reference signal). The slip threshold $\lambda_2$ is effective when no signal is present on connection line 34. In the abovementioned copending application, possibilities of switching the slip thresholds are described. Thus AND gate 33 has an output signal and makes time constant $\tau_2$ effective when the slip threshold $\lambda_2$ (80%) is effective and when the wheel speed signal has fallen below this threshold.

FIG. 6 shows the above condition at time $t_2$. In this figure, the slip threshold is also shown. In the period beginning at time $t_3$ the wheel speed does not fall below the threshold $\lambda_2$; therefore, here the time constant $\tau_2$ ' is effective.

In the system just described it is sensed on what kind of surface the vehicle is driving and thus which vehicle deceleration is present. This is done by means of monitoring the passing below the $\lambda_2$-threshold. This slip threshold is passed below when the vehicle drives on a low friction surface on which only a small vehicle deceleration is possible. Therefore, the memory means 16 are being switched to time constant $\tau_2$ as long as the slip threshold $\lambda_2$ is passed below.

Figure 7:
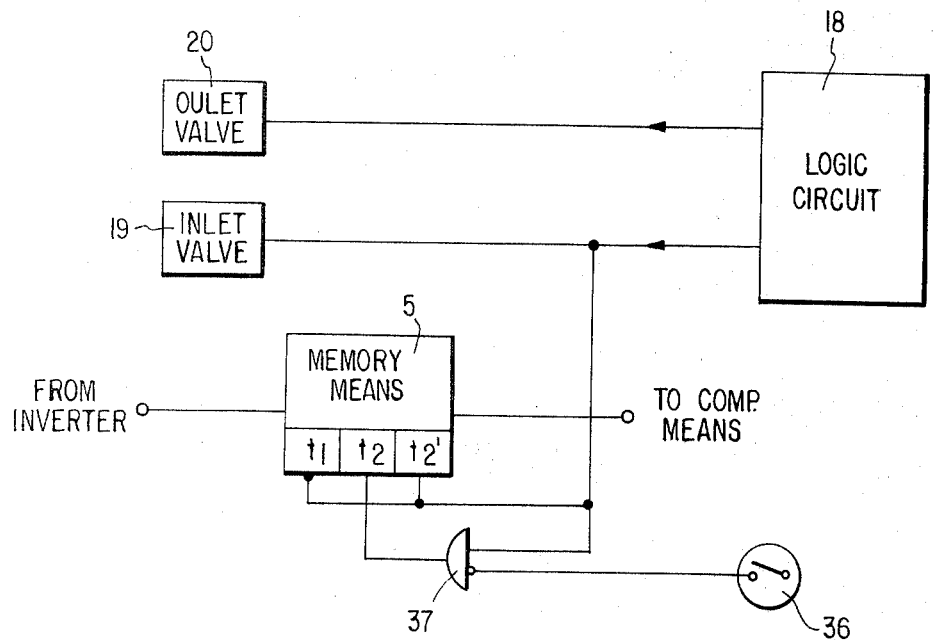
FIG. 7 is a part of a block circuit diagram of an antilocking control system illustrating another embodiment of the present invention.

A further embodiment for switching from $\tau_1$ to one of the time constants $\tau_2$ or $\tau_2$ ' ($\tau_2 > \tau_2$ ') is shown in FIG. 7. In this figure, only the memory means 5, the valves 19 and 20 and the logic circuit 18 of FIG. 1 are shown. In this embodiment, the memory means are switched from time constant $\tau_1$ to time constant $\tau_2$ ', when inlet valve 19 is energized from logic circuit 18 and when the brake fluid pressure switch 36 has closed, which is provided on the vehicle wheel and which closes when a given pressure is reached. With this antilocking control (control at high pressure on the vehicle wheel), the vehicle must drive on a surface with a relatively high friction, and a high vehicle deceleration must be present. Therefore, it is correct to make effective the time constant $\tau_2$ ', $< \tau_2$. With a surface with a small friction coefficient, and thus small vehicle deceleration, the antilocking control will continue with a low pressure of brake fluid. Then the pressure switch 36 is open for an essential part of the control cycle. Therefore, in this case (low vehicle deceleration) the highest time constant $\tau_2$ is made effective via the AND gate 37 having a negated input; $\tau_2$ ' then is ineffective (not shown). If necessary, the switching from $\tau_2$ ' to $\tau_2$ may be delayed.

Figure 8:
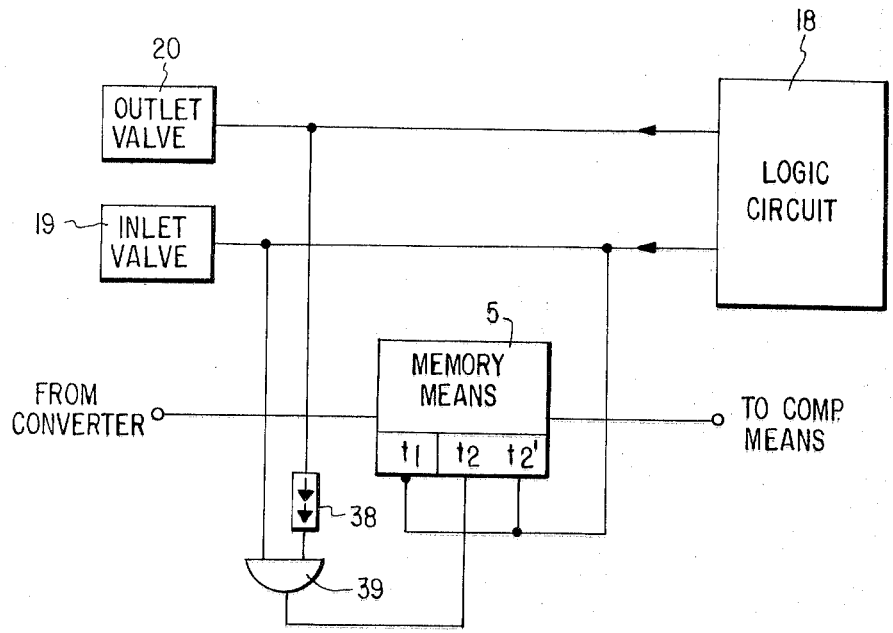
FIG. 8 is a part of a block circuit diagram of an antilocking control system illustrating another embodiment of the present invention.

A further simple embodiment is shown in FIG. 8, in which only the logic circuit 18, the memory means 16 and the valves 19 and 20 are shown. The input of the outlet valve is connected to an AND gate 39 via timing means 38. It is known that such timing means delay the signal fed to it for a given delay time, for example 20 msec, and prolongs the signal fed to it for a given period of perhaps 60 msec. Thus the signal energizing the outlet valve 20 is present at the input of the AND gate 39 when either the outlet valve is closed for a time longer than the given delay time (20 msec) or the valve is energized several times successively. A long or repeated operation of outlet valve 20 shows that the vehicle is driving on a surface with low friction and that therefore a low vehicle deceleration is effective. In this case, via the AND gate 39 the high time constant $\tau_2$ is made effective since otherwise the lower time constant $\tau_2$ ' is in effect.

Figure 9:
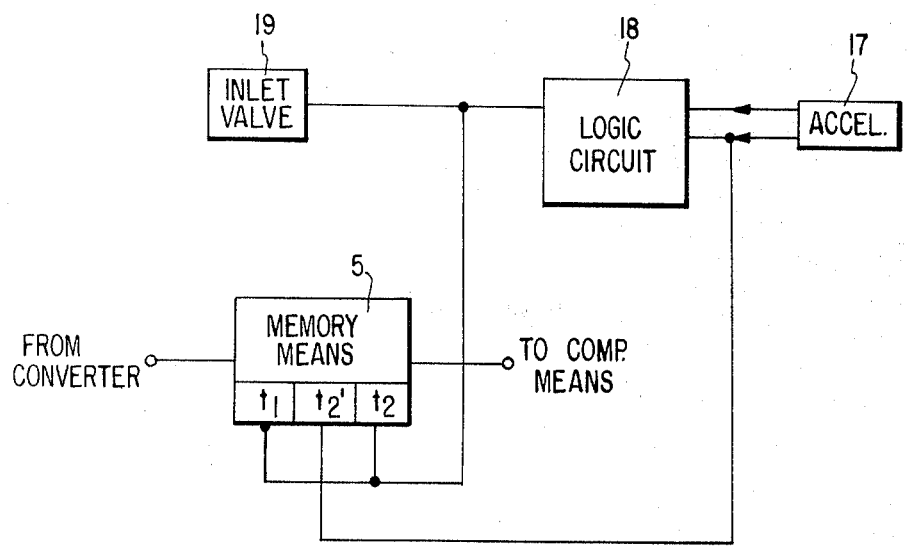
FIG. 9 is a part of a block circuit diagram of an antilocking control system illustrating another embodiment of the present invention.
Figure 10:
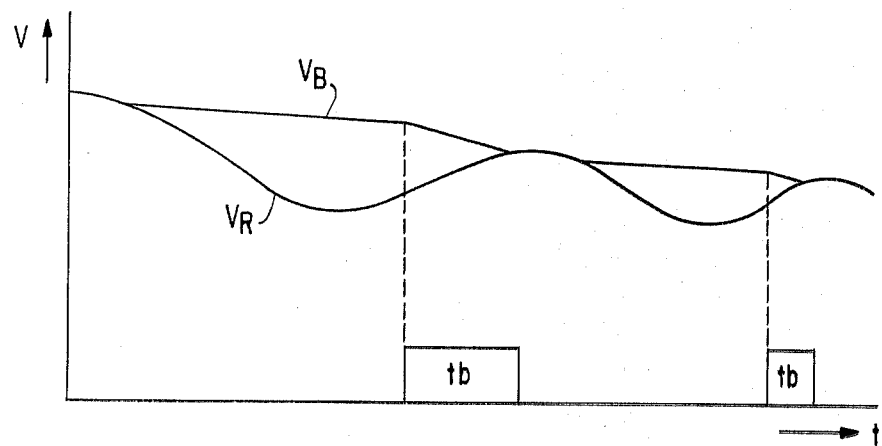
FIG. 10 is a graphical representation illustrating the formation of the reference signal developed in the circuits shown in FIG. 9.

In FIGS. 9 and 10, a further embodiment of the invention is shown, in which the switching information is generated in another manner. When a locking tendency occurs, logic circuit 18 switches the memory means 16 from $\tau_1$ to the high time constant $\tau_2$. When, however, the wheel accelerometer provides a signal indicating a predetermined acceleration of the wheel, the memory means 16 are switched to the lower time constant $\tau_2$ '. If the surface on which the vehicle is driving has a low friction coefficient, an acceleration signal as mentioned above is not provided or only present after a long time period. Hereby it is indicated that it was correct to make effective the high time constant $\tau_2$. If, however, the surface has a high friction coefficient, the acceleration signal will soon occur. Then the time constant $\tau_2$ ' is effective and the reference signal decreases until the wheel speed is reached. The curve is shown in FIG. 10. Herein the curve of the vehicle speed is again $v_R$, the curve of the reference signal is $v_B$ and $+b$ is the acceleration signal. The reference signal consists of two parts in which the different time constants $\tau_2$ and $\tau_2$ ' are effective. The curve of the reference signal leads into the curve of vehicle speed. This is very advantageous.

With regard to FIGS. 3–10, it should be mentioned that all the details described in connection with FIG. 1, concerning the combination of a reference signal with further reference signals generated on other wheels, can also be employed in an embodiment in which three or more discharge time constants are used.

It will be understood that the above description of the present invention is susceptible to various modifications, changes and adaptations and the same are intended to be comprehended within the meaning and range of equivalents of the appended claims.

We claim:

1. An antilocking control system in which wheel slip signals are generated for brake pressure modulation, wherein the means for generating such slip signals comprise:
   1. means for generating a signal which is substantially directly proportional to the rotational speed of a vehicle wheel,
   2. memory means for generating a reference signal approximating the vehicle speed, said memory means being connected to said generating means to receive the signal proportional to the rotational speed and including discharge means for causing the reference signal to vary at one of two different individually selectable discharge time constants, the first discharge time constant permitting the reference signal generated by said memory means to follow the signal proportional to the rotational speed substantially without delay and the second discharge time constant permitting the reference signal to correspond to a slow decrease in vehicle speed,
   3. comparison means connected to said generating means and said memory means for comparing the signal proportional to the rotational speed with the reference signal from said memory means and for generating an output signal for brake pressure modulation, when the rotational speed of the vehicle wheel is below the reference signal and in a certain relationship thereto, and
   4. switching means connected to said memory means and including sensing means operatively arranged to respond to the rotational behavior of such wheel for producing a control signal when such wheel shows a tendency to lock and for terminating such control signal when a permissible slip value is reached, said switching means switching said memory means to its second discharge time constant in response to the occurrence of the control signal produced by said sensing means when a locking tendency occurs and switching said memory means back to its first time constant in the absence of such control signal.

2. An arrangement as defined in claim 1 wherein: the reference signal provided by said memory means when its second time constant is effective corresponds to the decrease which will occur in the wheel speed on a road having a very low coefficient of friction; and said switching means switches said memory means back to its first time constant when the vehicle wheel re-acceleration phase is substantially completed.

3. An arrangement as defined in claim 1 wherein said sensing means includes accelerometer means connected for generating a first signal at first output means thereof when the negative acceleration of the wheel exceeds a given threshold, said first output means being connected in said switching means for causing such first signal to control the switching of said memory means to its second time constant.

4. An arrangement as defined in claim 3, wherein: said accelerometer means comprises means for providing a positive acceleration signal as a second output signal from a second output means of said accelerometer means; said second output means of said accelerometer means being coupled in said switching means so that said switching means is responsive to said second output signal for holding said memory circuit means in its second time constant condition whenever the positive acceleration of the braked wheel exceeds a given value, whereby said memory circuit means is switched to its first time constant whenever the wheel has passed below a permissible slip value and the reacceleration phase has been substantially completed.

5. An arrangement as defined in claim 1 wherein said sensing means includes accelerometer means for providing a signal representing the acceleration of the wheel, a normally open inlet valve coupled to an output of said comparison means, and wherein the second discharge time constant of said memory means remains effective as long as said inlet valve is closed and as long as said accelerometer means produces a positive acceleration signal indicating that the re-acceleration phase of the wheel has not yet been substantially completed.

6. An arrangement as defined in claim 1 wherein there are several comparison means each associated with a different vehicle wheel and the reference signal generated by said memory means in response to the speed of rotation of one vehicle wheel is fed to each of said comparison means.

7. An arrangement as defined in claim 6 wherein the one vehicle wheel is a nondriven wheel.

8. An arrangement as defined in claim 7 further comprising: means responsive to the rotational speeds of additional vehicle wheels for developing speed-related signals; and means responsive to said speed-related signals and output from said memory circuit means for developing said reference signal.

9. An arrangement as defined in claim 8 further comprising means responsive to said speed-related signals and the output of said memory circuit means for formulating said reference signal from the highest one of said speed-related signals whenever at least a substantial portion of it exceeds the output of said memory circuit means.

10. An arrangement as defined in claim 1 further comprising: separate control means for the brake pressure at first and second wheels of one axle; wherein there are two of said memory circuit means, the first wheel being associated with the first said memory circuit means and the second wheel being associated with the second said memory circuit means; said first memory circuit means and said second memory circuit means being fed respectively with signals proportional to the rotational speed of the respective associated wheels; the switching of the discharge time constants of the said two memory means being effected by signals which are derived from the associated wheel and which indicate a tendency of that wheel to lock; each of said memory circuit means furnishing output signals; and signal processing means coupled to an output means of said first memory circuit means and an output means of said second memory circuit means and responsive to said output signals for selecting the higher of said output signals as said reference signal.

11. An arrangement as defined in claim 10 wherein the reference signal, derived from the braked non-driven axle of the vehicle, is also used to control the brake pressure at the driven wheels.

12. An arrangement as defined in claim 10 further comprising: means responsive to the rotational speeds of additional vehicle wheels for developing speed-related signals; and means responsive to said speed-related signals and the output from said processing means for developing said reference signal.

13. An arrangement as defined in claim 12 further comprising means responsive to said speed-related signals and the output of said processing means for formulating said reference signal from the highest one of said speed-related signals whenever at least a substantial portion of it exceeds the output of said processing means.

14. An arrangement as defined in claim 13 further comprising an additional memory means to which the speed-related signal which is proportional to the highest rotational speed of the additional wheels is fed, said additional memory means having a first time constant and a second time constant; and further comprising means for switching said additional memory means to its second time constant as long as a signal proportional to the highest rotational speed of the additional wheels exceeds the reference signal obtained from the undriven axle, the output of said additional memory means furnishing then the reference signal.

15. An arrangement as defined in claim 12 comprising further processing means generating the reference signal and receiving the output signal of said processing means, which is the higher output of the outputs of said two memory means, and the highest speed-related signal of the other wheels, said further processing means forming, as reference signal, an average of at least substantial portions of its input signals.

16. An arrangement as defined in claim 1 further comprising: separate control means for the brake pressure at first and second wheels of one axle; wherein there are two of said memory circuit means, the first wheel being associated with the first said memory circuit means, and the second wheel being associated with the second said memory circuit means; said first and second memory being fed respectively with signals proportional to the rotational speed of the respective associated wheels; the switching of the discharge time constants of the said two memory means being effected by signals which are derived from the associated wheel and which indicate a tendency of that wheel to lock each of said memory circuit means furnishing output signals; and signal processing means coupled to an output means of said first memory circuit means and an output means of said second memory circuit means and responsive to said output signals for forming an average of said output signals, said average constituting the reference signal.

17. An arrangement as defined in claim 16 wherein the reference signal, derived from the braked non-driven axle of the vehicle, is also used to control the brake pressure at the driven wheels.

18. An arrangement as defined in claim 16 further comprising: means responsive to the rotational speeds of additional vehicle wheels for developing speed-related signals; and means responsive to said speed-related signals and the output from said processing means for developing said reference signal.

19. An arrangement as defined in claim 18 further comprising means responsive to said speed-related signals and the output of said processing means for formulating said reference signal from the highest one of said speed-related signals whenever at least a substantial portion of its exceeds the output of said processing means.

20. An arrangement as defined in claim 19 further comprising an additional memory means to which the speed-related signal which is proportional to the highest rotational speed of the additional wheels is fed, said additional memory means having a first time constant and a second time constant; and further comprising means for switching said additional memory means to the second time constant whenever a signal proportional to the highest rotational speed of the additional wheels exceeds the reference signal obtained from the undriven axle, the output of said additional memory means furnishing then the reference signal.

21. An arrangement as defined in claim 1 further comprising: separate means responsive to the rotational speeds of additional wheels for producing separate signals directly proportional to the individual speeds of the additional wheels; and means responsive to the output of said memory circuit means and to said separate signals for switching said memory circuit means to said second time constant whenever any one of said separate signals exceeds the output of said memory circuit means.

22. An antilocking control system in which wheel slip signals are generated for brake pressure modulation, wherein the means for generating such slip signals comprises:
1. means for generating a signal which is substantially directly proportional to the rotational speed of a vehicle wheel,
2. memory means for generating a reference signal approximately the vehicle speed, said memory means being connected to said generating means to receive the signal proportional to the rotational speed and including discharge means for causing the reference signal to vary at any one of at least three different individually selectable discharge time constants, the first discharge time constant permitting the reference signal generated by said memory means to follow the signal proportional to the rotational speed substantially without delay, the second discharge time constant permitting the reference signal to correspond to a very slow decrease in vehicle speed and the additional discharge time constants being different but higher than the first constant and lower than the second constant,
3. comparison means connected to said generating means and said memory means for comparing the signal proportional to the rotational speed with the reference signal from said memory means and for generating an output signal for brake pressure modulation, when the rotational speed of the vehicle wheel is below the reference signal and in a certain relationship thereto, and
4. switching means connected to said memory means and including sensing means operatively arranged to respond to the rotational behavior of such wheel for producing a control signal when such wheel shows a tendency to lock and for terminating such control signal when a permissible slip value is reached, said switching means switching said memory means from its first discharge time constant to one of the other discharge time constants in response to the occurrence of the control signal produced by said sensing means when a locking tendency occurs, such switching being dependent on vehicle deceleration in such a manner that the discharge time constant being made effective is chosen in such a manner that the higher the vehicle deceleration the lower the time constant, and said switching means acting to switch said memory means back to the first time constant in the absence of such control signal.

23. An arrangement as defined in claim 22 wherein, said switching means acts to switch said memory means back to its first time constant when the vehicle wheel re-acceleration phase is substantially completed.

24. An arrangement as defined in claim 22 wherein said sensing means includes accelerometer means for sensing vehicle deceleration and providing switching signals for the time constants when certain vehicle deceleration thresholds are reached.

25. An arrangement as defined in claim 22 wherein only three discharge time constants are provided and wherein the discharge time constant between the highest and the lowest constants is made effective by switching signals when a locking tendency occurs, and wherein the highest discharge time constant is made effective by switching signals when during the antilocking control the signal proportional to vehicle speed falls below a given slip threshold.

26. An arrangement as defined in claim 22 further comprising means connected for measuring the brake pressure at the wheel and wherein the individual discharge time constants are made effective by switching signals corresponding to brake pressure at the wheel during control, the lower the brake pressure the higher the effective discharge time constant.

27. An arrangement as defined in claim 22 wherein only three discharge time constants are provided and wherein the discharge time constant between the lowest and the highest discharge constants is made effective by switching signals when a locking tendency occurs, and wherein the highest discharge time constant is made effective by switching signals when brake pressure is decreased for a given time within a time period.

28. An arrangement as defined in claim 22 wherein only three discharge time constants are provided, and further comprising a wheel accelerometer, and wherein the highest discharge time constant is made effective by means of switching signals when a locking tendency occurs and wherein the discharge time constant between the lowest and the highest constants is made effective by switching signals when during antilocking control an acceleration threshold is exceeded as indicated by said wheel accelerometer.

29. An antilocking control system in which wheel slip signals are generated for brake pressure modulation, wherein the means for generating such slip signals comprise:
1. means for generating a signal which is substantially directly proportional to the rotational speed of a vehicle wheel,
2. memory means for generating a reference signal approximating the vehicle speed, said memory means being connected to said generating means to receive the signal proportional to the rotational speed and having two different individually selectable discharge time constants, these constants being chosen in such a manner that the signal stored in said memory means follows the signal proportional to the rotational speed substantially without delay when the first discharge time constant is effective, but provides a reference signal which corresponds to a slow decrease in vehicle speed, when the second discharge time constant is effective,
3. comparison means connected to said generating means and said memory means for comparing the signal proportional to the rotational speed with the reference signal from said memory means and for generating an output signal for brake pressure modulation, when the rotational speed of the vehicle wheel is below the reference signal and in a certain relationship thereto,
4. switching means connected to said comparison means and said memory means and responsive to signals indicating a locking tendency for switching said memory means to its second discharge time constant when a locking tendency occurs and for switching said memory means back to its first time constant only if a permissible slip value is reached; and
5. accelerometer means including means for providing a positive acceleration signal as an output signal from an output means of said accelerometer means; and wherein said switching means are coupled to said output means of said accelerometer means and are responsive to said output signal for holding said memory circuit means in its second time constant condition whenever the positive acceleration of the braked wheel exceeds a given value, whereby said memory circuit means is switched to its first time constant whenever the wheel has passed below a permissible slip value and the re-acceleration phase has been substantially completed.

* * * * *